United States Patent [19]

Yamada

[11] Patent Number: 4,625,234

[45] Date of Patent: Nov. 25, 1986

[54] METHOD OF USING A BUFFER MEMORY DEVICE FOR STORING A PLURALITY OF PICTURE SIGNALS

[75] Inventor: Mitsuhiko Yamada, Kyoto, Japan

[73] Assignee: Dainippon Screen Seizo Kabushiki Kaisha, Japan

[21] Appl. No.: 532,106

[22] Filed: Sep. 14, 1983

[30] Foreign Application Priority Data

Oct. 5, 1982 [JP] Japan .................................. 57-174976

[51] Int. Cl.[4] .............................................. H04N 1/46
[52] U.S. Cl. ......................................... 358/78; 358/75
[58] Field of Search ....................... 358/75, 76, 77, 78, 358/79, 80

[56] References Cited

U.S. PATENT DOCUMENTS

| | | | |
|---|---|---|---|
| 3,878,559 | 4/1975 | Pugsley | 358/75 |
| 4,305,093 | 12/1981 | Nasu | 358/75 |
| 4,346,401 | 8/1982 | Ohara | 358/75 |
| 4,415,925 | 11/1983 | Tamura | 358/75 |

Primary Examiner—James J. Groody
Assistant Examiner—Randall S. Svihla
Attorney, Agent, or Firm—Ostrolenk, Faber, Gerb & Soffen

[57] ABSTRACT

Disclosed is a method of using a buffer memory for storing a plurality of picture signals wherein picture signals of more than one types are stored in an alternating manner into a buffer memory and the stored picture signals are read out at predetermined address intervals so that the picture signal of a desired type may be picked out for subsequent use for each of the types. According to the method of this invention, the number of the types of the picture signals may be arbitrary since the memory device does not have to be divided into a plurality of blocks, and all the picture signals may be stored, substantially as they are picked up at a scanning head, in a buffer memory. To eliminate any time lag in the exact timing of picking up the picture signals of various types, a sample and hold circuit may be conveniently used.

12 Claims, 10 Drawing Figures

FIG. 5
| ADDRESS | DATA |
|---|---|
| 1 | $(D_1)_1$ |
| 2 | $(D_2)_1$ |
| 3 | $(D_3)_1$ |
| 4 | $(D_4)_1$ |
| 5 | $(D_5)_1$ |
| n | $(D_n)_1$ |
| n+1 | $(D_1)_2$ |
| n+2 | $(D_2)_2$ |
| n+3 | $(D_3)_2$ |
| n+4 | $(D_4)_2$ |
| n+5 | $(D_5)_2$ |
| 2n+1 | $(D_1)_3$ |
| 2n+2 | $(D_2)_3$ |
| 2n+3 | $(D_3)_3$ |
| (m-1)n+1 | $(D_1)_m$ |
| (m-1)n+2 | $(D_2)_m$ |
| (m-1)n+3 | $(D_3)_m$ |
FIG. 7
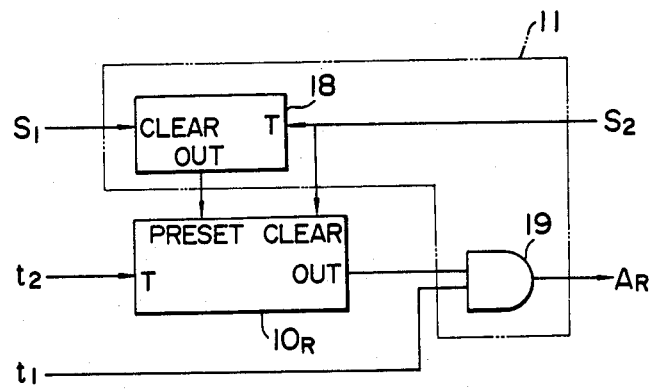
FIG. 6
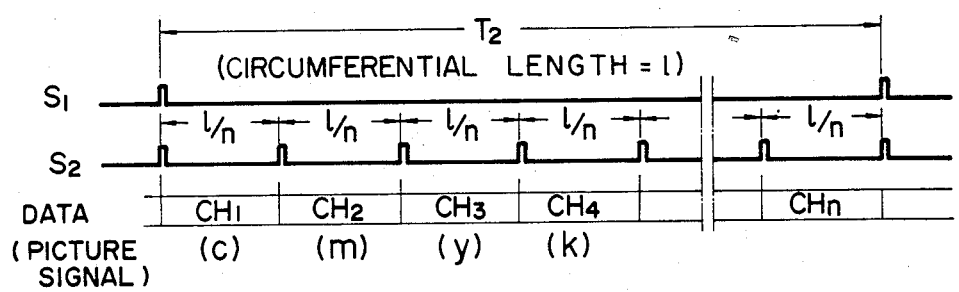

METHOD OF USING A BUFFER MEMORY DEVICE FOR STORING A PLURALITY OF PICTURE SIGNALS

BACKGROUND OF THE INVENTION

This invention relates to a method of using a buffer memory for recording a plurality of picture image signals for the purpose of facilitating the simultaneous recording of a plurality of color separation plates and mask plates in a color scanner for making printing plates.

Conventionally, in making color separation plates, certain color scanners have been capable of recording a plurality of color separation plates on one sheet of recording film in a simultaneous two-color or four-color mode according to the size of the color separation plates that are to be made, in order to increase the operation efficiency of the color scanners.

In order to make color separation plates in such a mode, it is necessary to store the recording picture signals corresponding to a plurality of color separation plates in advance and to have a buffer memory later read out the necessary color separation picture signals at a proper timing so that a picture reproduction recording can be achieved in the required time-divided mode.

Conventionally, such an end has been accomplished by a method of using a buffer memory device as illustrated in FIG. 1.

As shown therein, the picture signals obtained by scanning an original picture are color separated into color separation picture signals corresponding to the ink colors, such as cyan, magenta, yellow and black. To make color separation plates, various adjustment controls such as amendment, corrections, etc., are made to the color separation signals before they are transmitted to a buffer memory device as corrected color separation picture signals C, M, Y and K.

At the buffer memory device, each of the color separation picture signals C to K is sent to either one of a first to a fourth A/D (analog/digital) converters $B_1$ to $B_4$ by way of an analog switch circuit A which is controlled in accordance with the particular recording mode.

For instance, the first A/D converter $B_1$ is connected to the memory device P in such a manner that it may write date into any one of the first to fourth memory blocks $P_1$ to $P_4$ which the memory device P is broken into.

The second A/D converter $B_2$ is connected to the memory device P in such a manner that it can write data into both the second and the fourth memory blocks $P_2$ and $P_4$.

The third A/D converter $B_3$ is connected to the third memory block $P_3$ while the fourth A/D converter $B_4$ is connected to the fourth memory block $P_4$ in such a manner that they may write data into the corresponding memory blocks $P_3$ and $P_4$.

The memory device P has a memory capacity and an address space which are adapted to the resolution power of the picture image and the length of one primary scan (circumferential length of the recording cylinder), and the address space is divided into four parts, each corresponding to one of the memory blocks $P_1$ to $P_4$. This address space can include addresses for the address space of each of the memory blocks and these addresses may be assigned so as to be consecutive between neighboring memory blocks.

Such an address control is performed by an address generator F and a write address switching circuit $E_W$ and a read address switching circuit $E_R$ which are controlled according to the particular recording more being employed.

The data read out from each of the memory blocks $P_1$ to $P_4$ is sent to a D/A (digital/analog) converter H by way of a recording mode switching output gate circuit G.

In the buffer memory means of the above-described structure, when any one of the color separation signals C to K is to be recorded in a monochromatic mode, the analog switch A is controlled in such a manner that the necessary picture signal (e.g., signal C) is received from the first A/D converter $B_1$ and the output data of the first A/D converter is stored in the memory device P in such a manner as to have a series of consecutive addresses over all four of the memory blocks $P_1$ to $P_4$.

In the case of a simultaneous two-color recording mode, the necessary picture signal (e.g., signals C and M) is fed to both the first and the second A/D converters $B_1$ and $B_2$, and the output data of the first A/D converter $B_1$ is supplied to the first and the third memory blocks $P_1$ and $P_3$ while the output data of the second A/D converter $B_2$ is supplied to the second and the fourth memory blocks $P_2$ and $P_4$ in such a manner that the addresses are consecutive between each of the pairs of the memory blocks.

Furthermore, in the case of a simultaneous, four-color recording mode, the picture signals are sent to the corresponding A/D converters $B_1$ to $B_4$ and the output data of each of the four A/D converters $B_1$ to $B_4$ is stored in the corresponding memory block $P_1$ to $P_4$ so that the addresses are separate for each of the memory blocks $P_1$ to $P_4$.

When reading out the stored data, the data is read out from the memory device P and sent to the D/A converter H in the order of the addresses over the whole memory blocks in the case of the monochromatic mode, in the order of the addresses in each of the pairs of the memory blocks in the case of the two-color recording mode, and in the order of the addresses in each of the four memory blocks in the case of the four-color recording mode.

According to the above described buffer memory device, it is possible to achieve a simultaneous, multi-color recording mode in which a plurality of color separation pictures are sequentially (substantially simultaneously) obtained (recorded) on a single scanning exposure light beam for each revolution of the cylinder by dividing the circumferential length of the recording cylinder in a color scanner in association with the memory blocks which may be assigned with independent memory addresses.

On the other hand, it gives rise to the shortcoming that the data input line and the data output line for each of the memory blocks must be separated in order to divide the memory device P into a plurality of memory blocks $P_1$ to $P_4$.

Furthermore, since the address lines have to be controlled so that the addresses may be given individually to each of the memory blocks and may be consecutive between two of the memory blocks, each of the blocks must be separated with the result that the address control becomes complicated.

Additionally, since the data input line for each of the memory blocks $P_1$ to $P_4$ is separated from one another, a separate A/D converter must be provided for each of the memory blocks.

Also, since there is a desire to record special color isolation plates and mask plates at the same time in addition to the color separation plates of the four basic ink colors, the conventional method of using a buffer memory described above can not help but complicate the required device when such a result is to be achieved or the number of plates that are to be recorded simultaneously is increased to more than four.

Namely, in a simultaneous, three-color, five-color, six-color, seven-color or greater multi-color recording mode, a buffer memory can not be uniformly divided into a required number of memory blocks $P_1$ to $P_n$ since the buffer memory has to be divided into a number of parts other than two or four parts. Moreover, since a memory unit of one chip (one IC) or a memory device of an equivalent unit can not store two sets of data at the same time, the memory capacity is required to be greater than actually necessary as determined by the circumferential length of the recording cylinder and the pixel pitch, with the necessary number of color separation plates that have to be recorded at the same time and the kinds of the plates that are required to be recorded at the same time fully taken into account.

Additionally, since the used memory capacity in each of the memory blocks $P_1$ to $P_4$ varies depending on the number of plates that are to be recorded simultaneously and the total number of necessary plates, the control of reading and writing addresses as well as the control of the input and output data can not help becoming complicated.

BRIEF DESCRIPTION OF THE INVENTION

In view of such shortcomings of conventional methods of using a buffer memory in which the buffer memory has to be divided into a plurality of blocks for storing each of a plurality of picture signals from a train of picture signals obtained by scanning an original picture, a primary object of this invention is to provide a method of using a buffer memory for substantially simultaneously processing a plurality of picture signals which can simplify the input and output data lines, writing, reading and address lines, and the control of the addresses and can readily achieve a simultaneous multi-color recording mode using only one A/D converter.

Another object of this invention is to provide a method of using a buffer memory for storing a plurality of picture signals which can store an arbitrary number of picture signals without complicating the control of signals and, at the same time, does not require any change in the data format of the picture signals that are to be processed.

According to this invention such an object is accomplished by providing, in a picture image reproduction device which stores a plurality of picture signals, obtained by scanning a multi-colored original picture, in a buffer memory device and reads out each of the picture signals in appropriate timing to record (create) a plurality of reproduction picture images substantially at the same time, a method of using a buffer memory device for storing a plurality of reproduction picture images, comprising the steps of scanning an original picture to obtain a train of picture signals of more than one type, storing the the picture signals in the order as they are obtained in the buffer memory, reading the stored data at predetermined intervals so as to separate the signal of each type, and recording a reproduction picture image of each type according to the picture signal of the corresponding type.

BRIEF DESCRIPTION OF THE DRAWINGS

Now this invention is described in the following in terms of concrete embodiments with reference to the accompanying drawings, in which:

FIG. 5 is a memory map of the data stored in the buffer memory;

FIG. 6 is a time chart showing the relationship between the first and the second start pulses and the data which is read out;

FIG. 7 is a block diagram showing an example of means for generating the addresses for read-out;

DETAILED DESCRIPTION OF THE PREFERRED EMBODIMENTS

Figure 1:
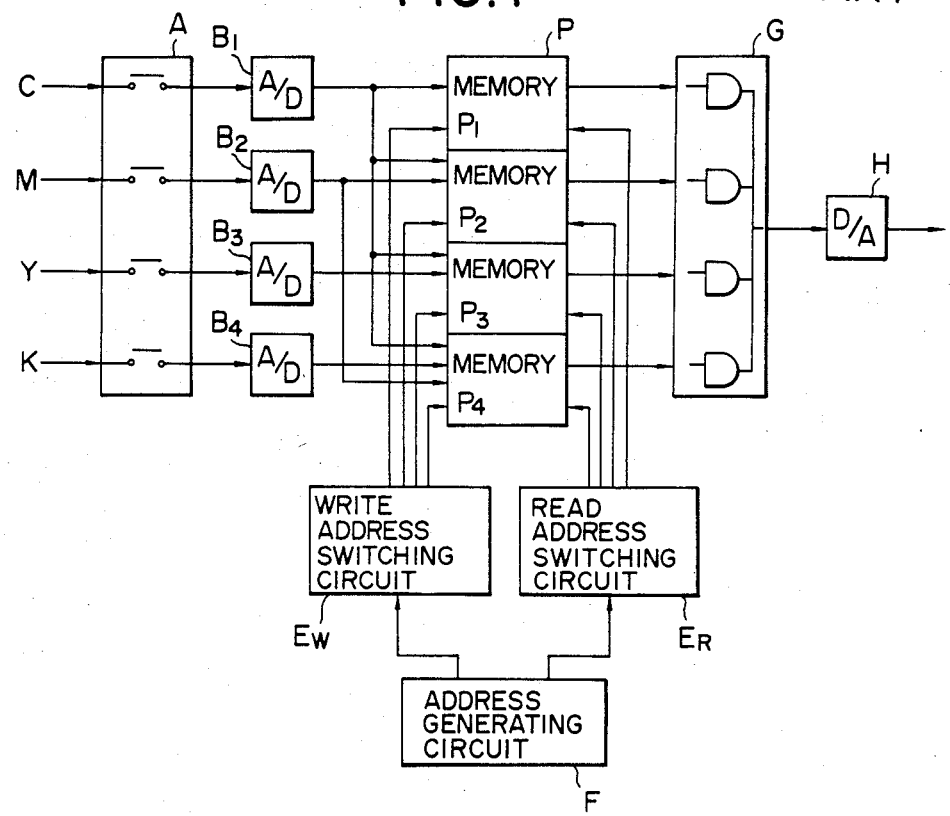
FIG. 1 is a block diagram of a conventional buffer memory system for processing a plurality of picture signals obtained from an original picture.
Figure 2:
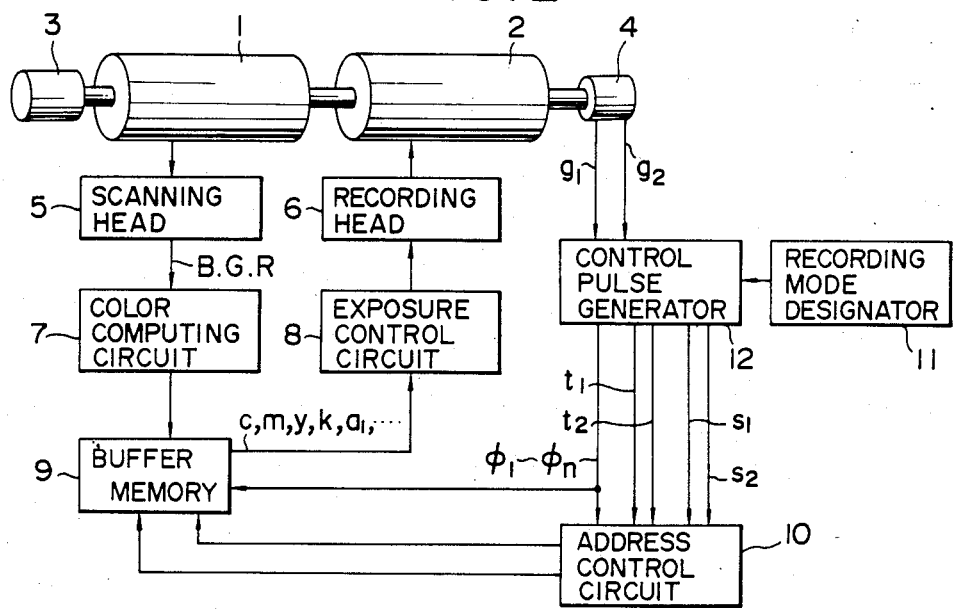
FIG. 2 is a block diagram of a color scanner which can produce a plurality of color separation plates in a simultaneous multi-color recording mode according to this invention.

In FIG. 2, a main part of a color scanner is illustrated to be comprised of an original picture cylinder 1, a recording cylinder 2, a motor 3 for rotating both the first and the second cylinders, a rotary encoder 4 for indicating the rotatory positions of the two cylinders 1 and 2, a scanning head 5 for photoelectrically scanning an original picture and producing color separation signals B, G and R, a recording head 6 which records reproduction picture images on a photographic film for recording by projecting a light beam for photographic exposure onto the photographic film, a color computation circuit 7 which, according to the color separation signals B, G and R, performs required color correction, masking correction, gradation correction and setting up and computation of various adjustment factors to produce corrected picture signals c, m, y and k corresponding to the printing ink colors of cyan, magenta, yellow and black, special color separation picture signals or picture signals for masking $a_1, a_2, \ldots$, as required, and an exposure control circuit 8 which modulates the light beam for photographic exposure of the recording head 6 according to one of the picture signals $c \sim k, a_1, \ldots$ which the exposure control circuit 8 receives from the color computation circuit 7.

The picture signals $c \sim k, a_1, \ldots$ of various colors or various types which are produced from the color computation circuit 7 as analog values are, according to the method of this invention, sent to the buffer memory 9 which stores the input picture signals $c \sim k, a_1, \ldots$ after they have been converted into a set of codes through A/D conversion, and the stored data is read out in the order which is based on the particular recording mode which was selected before the data is finally supplied to the exposure control circuit 8.

The buffer memory device 9 produces a command to generate clock pulses and timing pulses according to the desired recording mode in coordination with a control pulse generating circuit 12 at the same time as reading and writing the picture signal data $c \sim k$, $a_1$, ... according in the desired recording mode in cooperation with an address control circuit 10 and a recording mode designating means 11.

Figure 4:
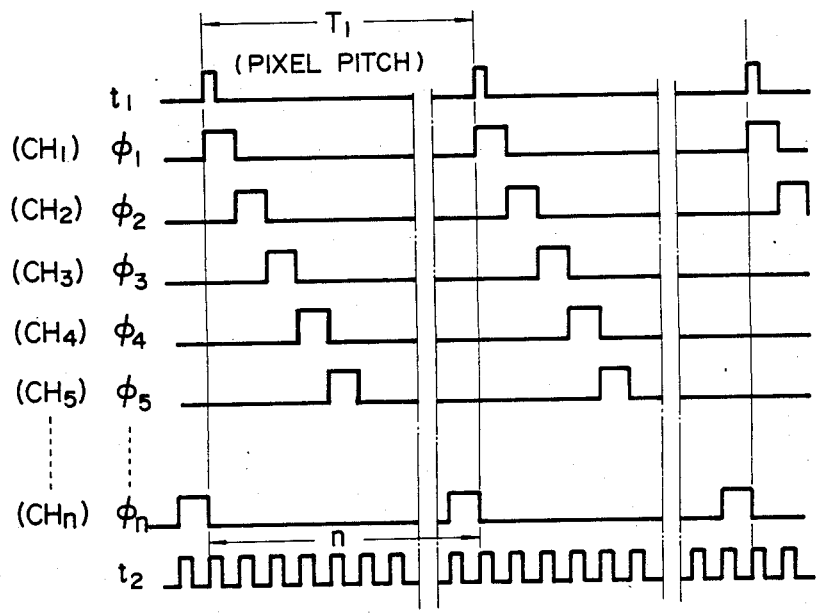
FIG. 4 is a time chart showing the timing between clock pulses, sampling pulses and n-phase clock pulses.

The control pulse generating circuit 12 produces the clock pulses $t_1$, the sampling pulses $t_2$, n-phase clock pulses $\phi_1 \sim \phi_n$ as shown in FIG. 4, and the first start pulses $S_1$ and the second start pulses $S_2$ as shown in FIG. 6, according to the reference pulses $g_1$ which are produced at predetermined reference positions of the cylinders 1 and 2 and the rotary phase pulses $g_2$ which are generated according to the rotary phases of the cylinders 1 and 2 by the rotary encoder 4.

Figure 3:
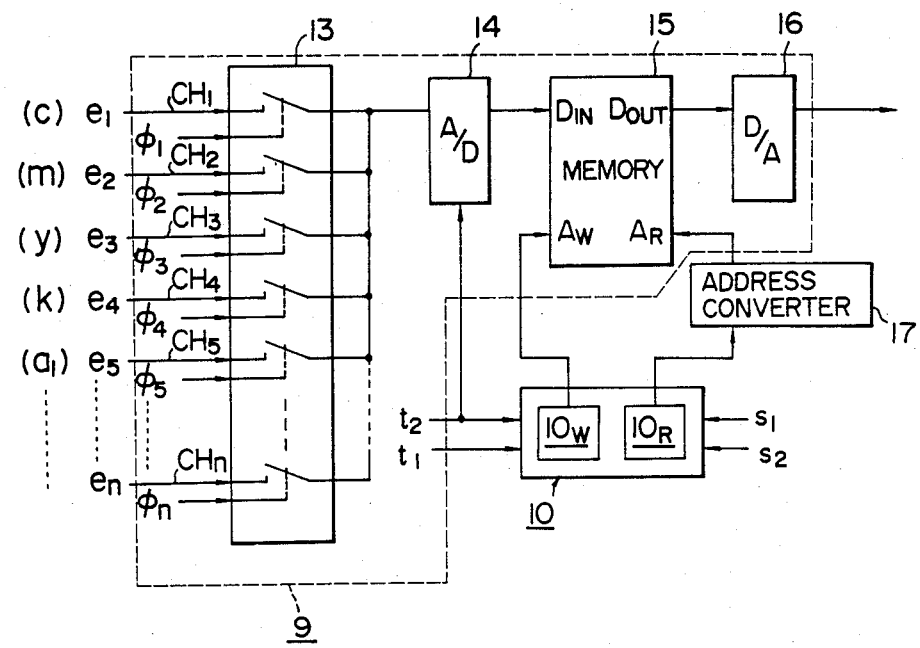
FIG. 3 is a block diagram of the buffer memory device of FIG. 2.

FIG. 3 shows an example of the above-described buffer memory device 9 to which each of the picture signals $c \sim k$, $a_1$, ... are supplied through the corresponding channel $CH_1 \sim CH_n$ of an analog multiplexer 13 as an input signal $e_1 \sim e_n$ which is associated with the corresponding channel $CH_1 \sim CH_n$, in an appropriate order.

The number of the channels n of the analog multiplexer 13 corresponds to the largest number of picture images that are desired to be recorded at the same time and is not limited to the predetermined number of channels or the number of input terminals of a semiconductor device.

The common output line of the analog multiplexer 13 is connected to the input of an A/D converter 14 whose output is connected to the data input terminal $D_{IN}$ of the memory device 15 while the data output terminal $D_{OUT}$ of the memory device 15 is connected to the input of a D/A converter 16.

The write address terminal $A_W$ of the memory device 15 is connected to a write address counter $10_W$ of the address control circuit 10 while the read address terminal $A_R$ is connected to a read address counter $10_R$ of the address control circuit 10 by way of an address converter 17.

The write address terminal $A_W$ and the read address terminal $A_R$ are comprised of a common terminal in an actual memory device and the reading and the writing are switched by a read/write enable signal with the actual address line which is connected to the memory device being a bus line, but the two terminals $A_W$ and $A_R$ are separately illustrated for the convenience of description.

The opening and closing of the switches of the analog multiplexer 13 is controlled by the n-phase clock pulses $\phi_1 \sim \phi_n$ which are generated by the control pulse generating circuit 12 as a function of the number of picture images n to be recorded, n being set at recording mode designating means 11. The clock pulses $\phi_1 \phi_n$ control the operation of multiplexer 13 in such a manner that the input signals $e_1 \sim e_n$ of the corresponding channels $CH_1 \sim CH_n$ are time-divided and arranged in a series along the time axis in the order of the channel numbers before they are sent to the A/D converter 14 (i.e., the input signals $e_1 \sim e_n$ are sequentially applied to the A/D converter in the order $e_1, e_2, e_3, \ldots e_n$).

The A/D converter 14 convert the input signals $e_1 \sim e_n$ of the corresponding channels $CH_1 \sim CH_n$, which are time-divided, into digital signal data $D_1 \sim D_n$ according to the sampling pulses $t_2$ which are generated in synchronization with the front edges of the n-phase clock pulses $\phi_1 \sim \phi_n$.

The suffixes $1 \sim n$ of the signals $e_1 \sim e_n$ and $D_1 \sim D_n$ corresponds to the channel numbers. The n-phase clock pulses $\phi_1 \sim \phi_n$ and the sampling pulses $t_2$ are synchronized with the clock pulses $t_1$ which are in turn synchronized with the rotational phase pulses $g_2$.

Also, the period $T_1$ of the clock pulses $t_1$ corresponds to the pixel pitch which determines the resolution power of the picture image to be recorded.

When writing data into the memory device 15, the address counter $10_W$ sequentially counts the sampling pulses $t_2$ and sequentially determines the addresses in the order of the input of the digital signal data $D_1 \sim D_n$ to store the input data as defined by the memory map of FIG. 5.

The data $(D_1)_1$, $(D_1)_2$, ... $(D_1)_m$ corresponds to the data $D_1$ of the input signal $e_1$ of the first channel $CH_1$ and indicates the first to the m-th A/D converted values $(D_1)_1$ to $(D_1)_m$. It is likewise the case with the data $D_2$, ... $D_n$ of the other channels.

The memory device 15 thus stores the time-divided data $D_1, \ldots, D_n$ of a plurality of channels in the order of the appearance of the data.

Therefore, in the case of the simultaneous four-color recording mode, for instance, $D_1$ corresponds to the cyan plate signal C, $D_2$ to the magenta plate signal M, $D_3$ to the yellow plate signal Y, and $D_4$ to the black plate signal K, and the buffer memory device stores the data of the color separation plate signals obtained by scanning an original picture in the order of $C_1$, $M_1$, $Y_1$, $K_1$, $C_2$, $M_2$, $Y_2$, $K_2$, $C_3$, $M_3$, $Y_3$, $K_3$, ... $C_i$, $M_i$, $Y_i$, $K_i$ in a sequential manner.

And, in the case of the simultaneous two-color mode, the data is likewise stored, for instance, in the order of $C_1$, $M_1$, $C_2$, $M_2$, $C_3$, $M_3$, ... $C_{2i}$, $M_{2i}$, and, in the case of the monochromatic mode, the data is stored in the buffer memory, for instance, in the order of $C_1$, $C_2$, $C_3$, ... $C_{4i}$ (note: only one group of records is described in the case of the two-color and the monochromatic mode).

Next, although the specific procedures are carried out by the means described in detail hereinafter, the order of reading out the picture signal data which was stored as described above is, for instance, $C_1$, $C_2$, $C_3$, ... $C_i$, $M_1$, $M_2$, $M_3$, ... $M_i$, $Y_1$, $Y_2$, $Y_3$, ... $Y_i$, and $K_1$, $K_2$, $K_3$, ... $K_i$, in the case of the simultaneous four-color recording mode, in the order of $C_1$, $C_2$, $C_3$, ... $C_{2i}$ and $M_1$, $M_2$, $M_3$, ... $M_{2i}$, in the case of the simultaneous two-color recording mode, and, in the order of $C_1$, $C_2$, $C_3$, ... $C_{4i}$, in the case of the monochromatic mode. This principle also applies to the case of simultaneous greater-than-four-color modes.

When reading out data from the memory device, data on the memory device corresponding to each of the channels $CH_1 \sim CH_n$ is read out at a certain address interval which is a function of pitch 1/n for each of the channels as illustrated in FIG. 6.

In the control pulse generating circuit 12, the first start pulses $S_1$ are generated precisely and in synchronization with the reference pulses $g_1$ once for each revolution of the cylinders 1 and 2, and the period $T_2$ of these first start pulses corresponds to the circumferential length 1 of the cylinders 1 and 2.

In a simultaneous recording mode, in accordance with the process of dividing the circumferential length 1 and assigning each picture record with the divided circumferential length, second start pulses $S_2$ are generated by equally dividing the period $T_2$ of the first start pulses $S_1$ by the factor of n.

The second start pulses $S_2$ are used to read out the first data element of the desired channel data from the memory device 15.

Figure 8:
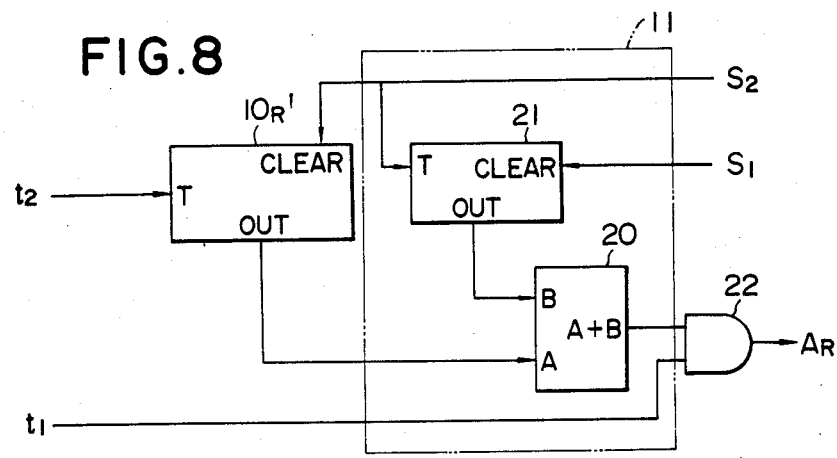
FIG. 8 is likewise a block diagram showing another means for generating the addresses.

FIGS. 7 and 8 show two examples of read address generating circuits.

FIG. 7 shows how a counter 18 for presetting an initial value associated with the address counter $10_R$ and the count of the counter $10_R$ is preset to its initial value of 1, 2, . . . n as appropriate.

The count in counter 18 is cleared at the beginning of each rotation of drum 2 in response to the generation of the first start signal $S_1$. The count is increased by one in response to each second start signal $S_2$. As such, the instantaneous count in counter 18 will be equal to the channel number of the picture image being recorded by recording head 6.

As the count corresponds to the channel number which is needed after the output of the second start pulses, the count is loaded onto the address counter $10_R$ immediately after the address counter $10_R$ is cleared by the second start pulses.

The address counter $10_R$ counts the sampling pulses $t_2$ (beginning at the preset value determined by counter 18) and advances the address accordingly (the address is indicated by a plurality of bits but the address line is represented by a single line). Each n-th value of the output is applied to the memory device 15, via AND gate 19 which also receives pulses $t_1$.

Thus, the data read out from the memory device 15 becomes a set of data which is read out from the memory device at a certain interval with the initial preset values $1 \sim n$ corresponding to either one of the channel members assigned as the first address, and the data is arranged in series for each of the channels. By way of example, if the channel number corresponding to the type of picture signal being read out of memory 15 is equal to 1, the data is output in the order $(D_1)_1, (D_1)_2, (D_1)_3, \ldots, (D_1)_m$.

In the embodiment shown in FIG. 8, the reading of data is always synchronized with the addresses of the data $D_1$ of the first channel $CH_1$, and the addresses are assigned by adding $n-1$ to each of the address numbers 1, $n+1$, $2n+1$, . . . $(m-1)n+1$ for the desired channel n.

The address counter $10_R'$ counts the timing pulses $t_2$ and its output is sent to an adder 20 while the other input of the adder 20 receives the output from a counter 21 which counts the second start pulses $S_2$.

The address counter $10_R'$ is temporarily cleared by the second start pulse and starts counting anew for each of the channels while the counter 21 is cleared by the first start pulse and counts the second start pulses $S_2$.

The timing of the clearing of the counter 21 is so determined that the counter 21 does not count the first pulse of the second pulses $S_2$ and counts the $(n-1)$-th value instead.

The clock pulses $t_1$ that are to be applied to AND gates 19 and 22 may be any of the n-phase clocks $\phi_1 \sim \phi_n$.

The picture signals $c \sim k$, $a_1$, . . . which are to become the input signals $e_1 \sim e_n'$ of the channels $CH_1$ to $CH_n$ may be a plurality of picture signals obtained by scanning a single original picture and the reproduction pictures which are recorded at the same time are used for overlaying one another.

Therefore, in the embodiment shown in FIG. 3, since the time-division is performed on the analog signal, the sampling positions for A/D conversion may vary for each picture image and, although the error is within the range of one pixel, some disagreement may occur when overlaying a plurality of reproduction picture images or an accurate masking plate may not be obtained.

Figure 9:
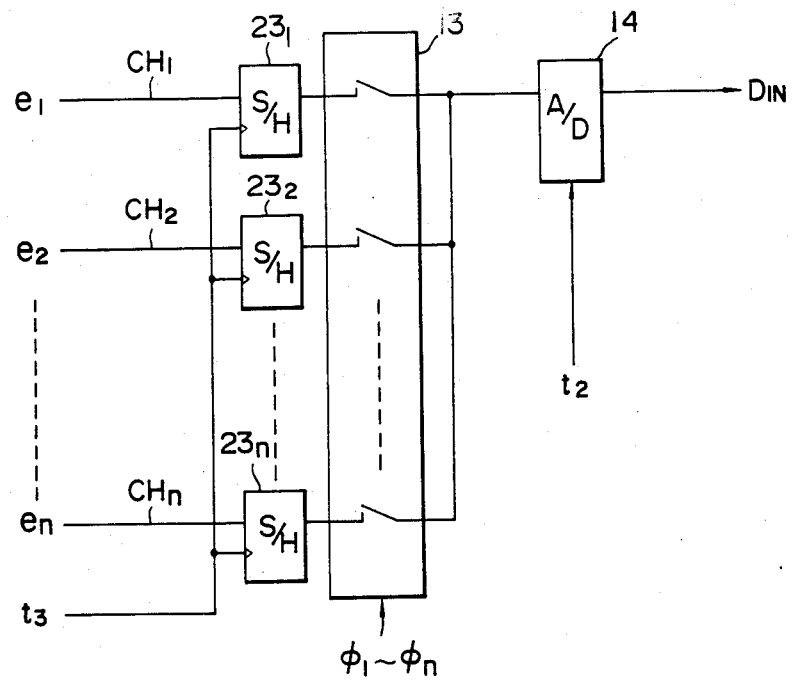
FIG. 9 is a block diagram of an embodiment of the method of this invention in which the sampling positions are equalized.

FIG. 9 shows another embodiment to eliminate such a disagreement. A sample and hold circuit $23_1 \sim 23_n$ is provided before each of the input channels of the multiplexer 13 so that the picture signals which are sampled and held at the identical positions are always time-divided and sent to the A/D converter 14.

Figure 10:
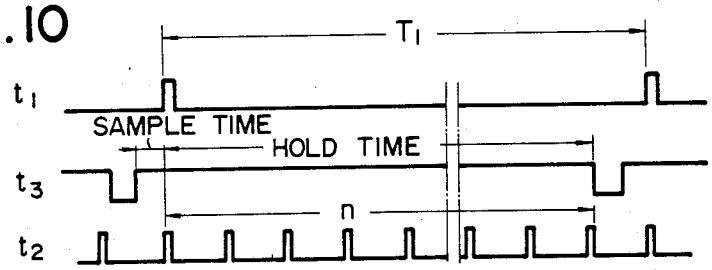
FIG. 10 is a time chart showing the relationship between the clock pulses, sampling pulses and sample-and-hold pulses.

FIG. 10 shows the relationship of the sample and hold pulses $t_3$ in regards to the clock pulses $t_1$ and the sampling pulses $t_2$, and the sample and hold pulses $t_3$ are appropriately generated by the control pulse generating circuit 12.

The number of channels n that is to be selected for processing the above-mentioned picture signals is selectively designated by the recording mode designating means 11 and, at the same, the phase number n of the n-phase clock pulses $\phi_1 \sim \phi_n$ and the number of channels used are determined.

At this moment, the unused channels of the multiplexers may be left as they are without creating any problem.

Therefore, the number of reproduction pictures that can be recorded at the same time is determined by the maximum number of channels that can be processed and this is in turn determined by the processing speed of the A/D converter 14. Thus, it is determined independently from the addressing means of the memory device 15.

As described above, according to this invention, the address control of the writing and reading of the buffer memory device is simplified and simultaneous recording modes for a multiplicity of picture images can be readily provided. Furthermore, according to this invention, a control means for a buffer memory which can facilitate the switching of recording modes is additionally provided. Moreover, the capacity of the memory device may be the one determined by the recording cylinder and the pixel pitch and no superfluity in the memory capacity is required.

Although the present invention has been described in terms of specific embodiments, it is obvious to a person skilled in the art that various replacements and modifications may be made without departing from the spirit of this invention which is set forth in the appended drawings.

What is claimed is:

1. In a picture image reproduction device which stores a plurality of picture signals, obtained by scanning a multi-colored original picture, in a buffer memory device and reads out each of the picture signals in appropriate timing to record a plurality of reproduction picture images substantially at the same time, a method of using a buffer memory device for storing a plurality of picture signals, said method comprising the steps of:
   scanning an original picture to obtain a train of picture signals of n different types, n being an integer greater than one;
   storing the picture signals in sequential addresses of the buffer memory device in the order they are obtained;

reading the stored data out of the buffer memory device at a predetermined address interval so as to separate the picture signals of each type and thereby read picture signals of the same type out of said buffer memory device in sequential order; and recording a reproduction picture image of each type according to the picture signal of the corresponding type.

2. A method of using a buffer memory device as defined in claim 1, wherein said predetermined interval is equal to n.

3. A method of using a buffer memory device as defined in claim 2, wherein the picture signals of n types are simultaneously obtained and are arranged by a sample and hold circuit in such a manner that all the picture signals are sequentially stored in a single buffer memory.

4. A method of using a buffer memory device as defined in claim 3, wherein the different types of picture signals correspond to different colors for recording color separation plates.

5. A method comprising the steps of:

scanning a multicolored original picture and producing a train of picture signals of n different types, n being an integer greater than 1, each type of picture signal representing a different color component of said original picture, each picture signal of a given type representing a different pixel of said original picture and being interlaced with pictures signals of different types;

reading said picture signals into sequential storage locations of a memory device in the order in which said signals are produced such that picture signals stored in adjacent storage locations of said memory device are of different types; and reading said picture signals out of said memory device in a different order than the order in which they were read into said memory device such that signals of the same type are read out sequentially.

6. The method of claim 5, wherein said multicolored original picture is scanned line by line and pixel by pixel, and picture signals corresponding to each of said n types are sequentially generated for each successive said pixel.

7. The method of claim 6, further including a step of producing color separation plates as a function of said picture signals read out of said memory device.

8. The method of claim 7, where said color separation plates are produced line by line and pixel by pixel, and wherein said picture signals are read out of said memory device in such a manner that all picture signals corresponding to a given line and of a given type are read out sequentially in a group.

9. Apparatus, comprising:

means for scanning a multicolored original picture and producing a train of picture signals of n different types, n being an integer greater than one, each type of picture signal representing a different color component of said original picture, each picture signal of a given type representing a different pixel of said original picture and being interlaced with picture signals of different types;

means for reading said picture signals into sequential storage locations of a memory device in the order in which said signals are produced by said scanning means such that picture signals stored in adjacent storage locations of said memory device are of different types; and means for reading said picture signals out of said memory device in a different order than the order in which they were read into said memory device such that signals of the same type are read out sequentially.

10. The apparatus of claim 9, wherein said scanning means scans said multicolored original picture line by line and pixel by pixel, and picture signals corresponding to each of said n types are sequentially generated for each successive said pixel.

11. The apparatus of claim 10, further including means for producing color separation plates as a function of said picture signals read out of said memory device.

12. The apparatus of claim 11, wherein said color separation plate forming means produces said color separation plates line by line and pixel by pixel, and wherein said reading means reads said picture signals out of said memory device in such a manner that all picture signals corresponding to a given line and of a given type are read out sequentially in a group.

* * * * *